United States Patent Office
3,686,137
Patented Aug. 22, 1972

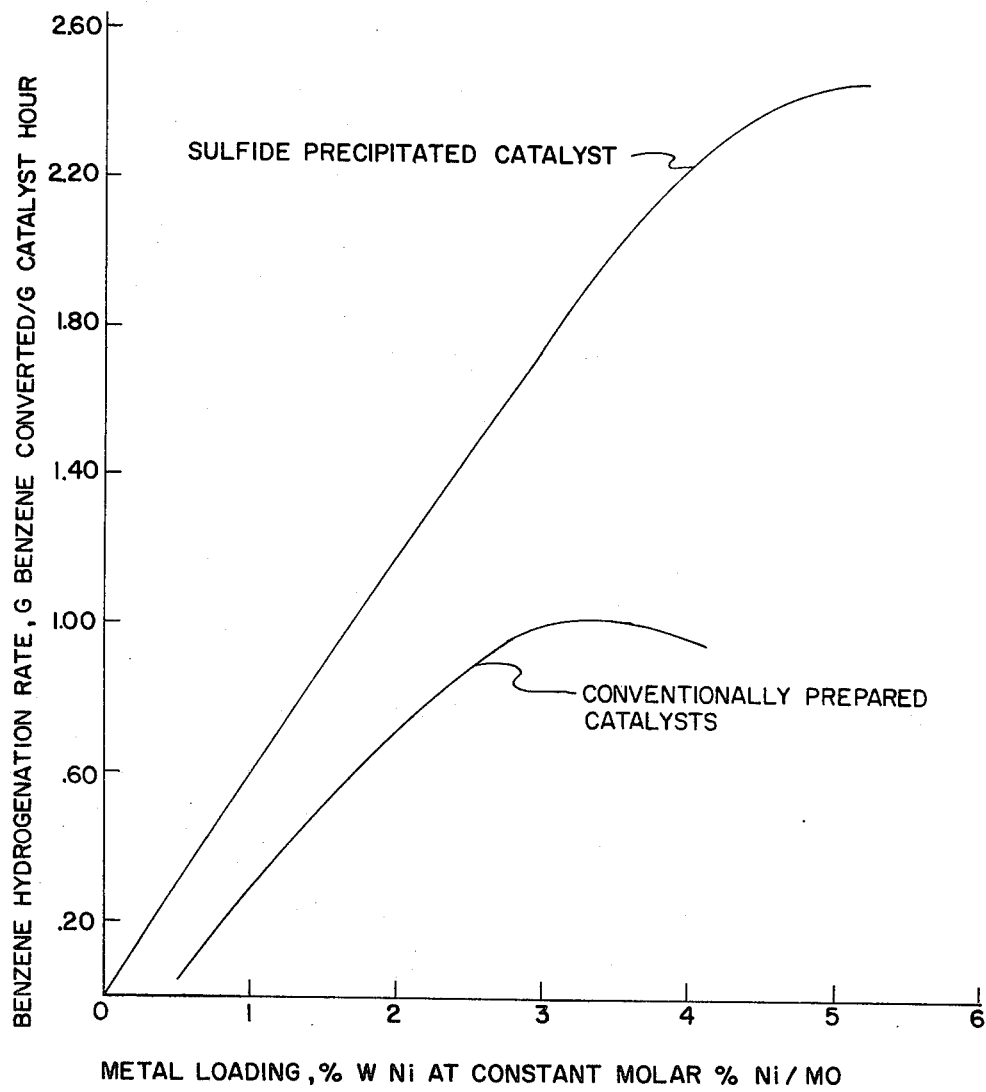

3,686,137
SULFIDE PRECIPITATED CATALYSTS
Anthony R. Gatti, Pasadena, Tex., assignor to
Shell Oil Company, New York, N.Y.
Filed July 6, 1970, Ser. No. 52,323
Int. Cl. B01j 11/74
U.S. Cl. 252—437                                    11 Claims

ABSTRACT OF THE DISCLOSURE

A supported metal sulfide catalyst prepared by impregnating a porous solid catalyst support with an aqueous solution of a salt of a hydrogenation metal component selected from the group consisting of molybdenum, tungsten, iron group metals, and mixtures thereof, precipitating the respective metal sulfides and subsequently drying in an inert atmosphere possesses improved hydrogenation, denitrification and desulfurization activity.

BACKGROUND OF THE INVENTION

This invention relates to a novel process for the preparation of catalysts comprising a metal sulfide hydrogenation component supported on a solid catalyst base material.

Various meals, such as for example Group VI–B and Group VIII metals or their oxides or sulfides, either alone or conjointly deposited on a support, have been prepared for use in a variety of chemical reactions as catalysts. These catalysts have proved particularly useful in hydrocarbon hydrogenation processes, as for example, hydrodenitrogenation, hydrosulfurization, hydrogenation of olefins, hydrogenation of aromatics, etc.

However, when using conventional techniques of catalyst preparation two effects highly detrimental to catalyst activity may occur. These are the so called "concentration" effect and the "high surface temperature" effect. For example, a widely used procedure for the preparation of catalysts involves dissolving one or more appropriate metal salts in an aqueous solution and impregnating a porous support with the salt solution. The impregnated support is then dried and calcined in air, thereby converting the metals to their oxides. The air drying and calcination can give rise to the "concentration" and "high surface temperature" effect.

As the water evaporates from the solution during the drying step, the remaining solution might be collected or concentrated in some preferred location within the support and thus lead to the formation of pockets or aggregates of the metal salts. Secondly, calcination in air is, in effect, burning the salts to their oxides. Under such conditions, individual crystallite temperatures can be much higher than the measured bulk temperature. A high particulate temperature could easily lead to undesirable structural changes.

When the catalytic component is to be in the metallic state or the sulfide state, the calcined catalyst is treated with a reducing agent, such as hydrogen, and/or with a sulfur compound to convert the metal oxide to the desired form. Conventionally, the calcined catalyst is heated in the presence of hydrogen to a temperature of about 500° F.– 1000° F. to reduce the metal oxide. For sulfiding, the metal oxide or reduced catalyst is heated with hydrogen sulfide, generally in admixture with hydrogen, to a temperature of about 500° F.–1000° F. These high temperature treatments can also be detrimental due to the tendency of the metal crystallites to agglomerate.

SUMMARY OF THE INVENTION

It has now been discovered that an improved catalyst can be prepared by impregnating a porous solid catalyst support with an aqueous solution of desired metal salts, contacting the wet impregnated support with hydrogen sulfide thereby precipitating the metals as sulfides within the pores of the support, and drying the catalyst in an inert atmosphere, i.e., an atmosphere which does not oxidize or reduce the metal sulfide.

The impregnating compounds are advantageously salts of iron, nickel, cobalt, molybdenum, and tungsten. The iron group compounds are generally water-soluble as for instance sulfates, nitrates, halides, etc. Nickel nitrate is a preferred compound. The Group VI compounds are also usually water-soluble as for instance ammonium molybdate and ammonium tungstate. For compounds which have insufficient solubility to provide the desired concentration, acids, hydrogen peroxide, ammonia, or other solubilizing agents can be used. Carbonates usually fall into this group of only slightly soluble compounds, but are nonetheless especially preferred. Solubilizing agents such as hydrogen peroxide which provides oxygen are less desired as they tend to reduce the benefits of the invention. Preferred solubilizing agents are acids of phosphorus, especially, $H_3PO_4$ and $H_3PO_3$. Especially preferred is $H_3PO_3$. Apparently $H_3PO_3$ has less of an oxidizing effect than $H_3PO_4$, and is therefore more effective in improving catalytic activity.

Surprisingly, the diminished oxidizing effect of $H_3PO_3$ as compared to $H_3PO_4$ even carries through when strong oxidizing agents are present in the impregnating solution. For example, when $H_2O_2$ is employed as a solubilizing agent in addition to a phosphorous-containing acid in preparing a catalyst according to this invention, it was found that the impregnating solution containing $H_2O_2$ and $H_3PO_3$ produced a catalyst with higher activity than a solution containing $H_2O_2$ and $H_3PO_4$.

The amount of metal added to the support is that amount sufficient to provide the support with catalytically effective amounts of the metal components. The amount actually added, within limits of efficiency, is dependent upon the use for which the catalyst is to be designed. In general, the amount of catalytically active metal is from 0.1% to about 40% w. or more, preferably about 1% to 30% w. Particularly advantageous are catalysts having about 10% to 30% w. hydrogenative metal component.

Any suitable catalytic support can be used. Suitable supports include, for instance, the refractory metal oxides having a rather large surface area, e.g., above about 50 sq. m./g. and preferably above about 100 sq. m./g., such as alumina, silica, magnesia, titania, zirconia, thoria, or mixtures thereof. Alumina is the preferred support material.

The impregnation step of the present invention can be accomplished by any technique known in the art. Advantageously, an aqueous solution of the metal compounds having a volume equal to the support pore volume is added to the support and the mixture of the support and metal compound solution permitted to stand for a few minutes until the solution is adsorbed or if necessary, the compound solution and the support can be allowed to stand for about 10–15 minutes, and heated gently to facilitate the adsorption.

The impregnated support, while still wet with the impregnating solution, is contacted with hydrogen sulfide to precipitate the metal sulfides. The sulfide precipitation can be effected under any desired pressure of hydrogen sulfide. Preferably, slightly elevated pressures, e.g., up to about 250 p.s.i.g. are preferred. Contact with hydrogen sulfide is maintained for a sufficient length of time to complete the reaction of the metal ions and the hydrogen sulfide. In general, from about 10 minutes to 100 hours is sufficient; however, from about 3 hours to 70 hours is preferred since there is a tendency to improve hydrogenation activity the longer the catalyst is under hydrogen sulfide pressure. In addition, aging the sulfide precipitated catalyst in the presence of hydrogen sulfide at a slightly elevated temperature, e.g., about 100° to 300° F. is beneficial and is preferred. The duration of the aging can vary widely and preferably is about 30 minutes to 10 hours.

After sulfiding, the catalyst is dried with a non-oxidizing, non-reducing and essentially inert gas such as nitrogen helium, $CO_2$ and the like. This can be done at elevated temperatures, preferably at about 500–1000° F.

Catalysts prepared according to the present invention, i.e., by precipitation of metal sulfides within the pore structure of a catalyst support and dried in an inert atmosphere, not only avoid the potentially detrimental effects of concentrating the aqueous salt solution during drying, and burning of the metal salts in oxygen during calcination, but show better hydrogenation, denitrification and desulfurization activity than that shown by conventionally prepared catalysts. The sulfide precipitated catalysts of the present invention can also be prepared at higher metal loadings than conventional catalysts without loss of metal hydrogenation efficiency. The drawing which is a plot of metal loading versus hydrogenation activity, substantiates this.

The following examples are included to further illustrate and not to limit the present invention, and to demonstrate its advantages over conventionally prepared catalysts.

EXAMPLE I

To demonstrate the superior hydrogenation activity of a catalyst prepared according to the invention, a 100 g. quantity of alumina support was impregnated with an aqueous nickel nitrate, ammonium molybdate solution having phosphoric acid as a solubilizing agent, the solution concentration being such as to provide a final catalyst composition of 2.9% w. nickel, 12.0% w. molybdenum and 2.0 w. phosphorus. Ammonium molybdate, 29.57 g. (54.31% Mo) and 42 ml. of demineralized water were mixed and heated gently with stirring until a clear solution resulted. This solution was slowly added with agitation to a solution of nickel nitrate, 17 ml. (0.23 g. nickel ml. solution) containing 4 ml. phosphoric acid (85%) for a total volume of approximately 67 ml. The phosphoric acid served to stabilize the solution containing the nickel and molybdenum salts. The solution was slowly poured over the alumina support at room temperature, and allowed to stand for a few minutes until the total volume of 67 ml. (equal to the pore volume of the support) was adsorbed. The wet impregnated support was then divided into two equal portions. A first portion, Catalyst "A," was prepared in accordance with the prior art by being dried at 250° F. for two hours and calcined at 900° F. for two hours under a flow of 1.0 s.c.f./hr. of air. The second portion, Catalyst "B," was placed in a stainless steel vessel for approximately one hour at room temperature under a pressure of 200 p.s.i.g. of hydrogen sulfide in order to precipitate the metal sulfides from the aqueous solution contained within the support pores. After venting off excess hydrogen sulfide, the precipitated sulfide catalyst was dried with nitrogen at increasing temperatures up to 700° F. for approximately four hours.

Both portions were tested for benzene hydrogenation activity under identical conditions. Each was pretreated with 2.7% v. $H_2S$ in $H_2$ for 30 minutes at 392° F. (200° C.), and one hour at 698° F. (370° C.). This served to convert the nickel and molybdenum in Catalyst "A" to the sulfide form. While Catalyst "B" was already in the sulfide form, the pretreatment was employed nonetheless to provide a duplicate procedure. After the sulfide treatment, the temperature was lowered to 662° F. (350° C.) and the catalyst contacted by a mixture of hydrogen and benzene (containing 0.5 w. S as dimethyl disulfide). The hydrogen to oil mole ratio was 11 and the weight hourly space velocity (weight of feed per weight of catalyst per hour, WHSV) was 11. Pressure was 1000 p.s.i.g. The hydrogenation rate, measured in grams of benzene converted per gram of catalyst per hour, after 5 hours, was 1.17 for the control Catalyst "A" and 1.63 for the sulfide precipitated Catalyst "B."

Thus, the catalyst prepared by the instant invention showed markedly improved activity over that obtained with a conventionally prepared catalyst.

EXAMPLE II

To illustrate the effect of post impregnation drying treatment on benzene hydrogenation activity, three catalysts were prepared as in Example I on an alumina support in a manner such that the final catalyst composition of each was 2.9% w. Ni, 12.0% w. Mo, and 2.0% P. However, treatment following impregnation was varied. The post impregnation treatments and the conversion constants for benzene hydrogenation at 662° F. (350° C.) are listed in Table 1. Pretreatment of the catalysts prior to testing for benzene hydrogenation activity was identical to that in Example I.

TABLE 1

| Catalyst No. | Post impregnation treatment | g. benzene con./g. cat. hr. |
|---|---|---|
| 1 | $H_2S$, precipitation; dried in $N_2$ at 752° F | 1.95 |
| 2 | Dried in air at 752° F | 1.53 |
| 3 | Dried in $N_2$ at 752° F | 1.59 |

It is readily apparent that the catalyst prepared according to the invention, i.e., sulfide precipitated, non-oxidizing drying system, is markedly more active than the others.

EXAMPLE III

To illustrate the advantages of precipitating the catalyst material within the support pores, one hundred gram batches of catalyst were prepared with varying percentages of nickel and molybdenum, the percentage of residual phosphorus being 2% w. in all cases. A number of alumina-based catalysts, were prepared conventionally by impregnation, air calcination and sulfiding and by the sulfide precipitation method of the invention. As in the previous examples, solutions of such concentrations as to give the desired metal percentages were used. The molar ratio of Ni to Mo was maintained at 0.40 in both the conventionally prepared and sulfide precipitated catalysts. The conventional catalysts were dried for two hours at 250° F. and calcined for two hours at 900° F. under a flow of 1.0 s.f.c./hr. of air. Sulfiding was effected in a hydrogen atmosphere with a sulfur-containing hydrocarbon feed used in the hydrogenation test.

The catalysts of the present invention were prepared by placing the still wet impregnated support at room temperature in a stainless steel bomb under 200 p.s.i.g. of $H_2S$ for one hour. The catalyst was then dried with 8 s.c.f./hr. of nitrogen at temperatures up to 752° F. for a total of 4.5 hours.

The catalysts were then used to effect benzene hydrogeneration as described before at 662° F., 11 WHSV, 11 $H_2$/oil mole ratio and 1000 p.s.i.g.

The variation of the benzene hydrogenation rate with metal loading (plotted as percent w. Ni since the Ni/Mo ratio is constant at 0.40) is shown in the drawing. Further, with reference to the drawing, the conventional catalyst has an intercept near 0.5% w. Ni while the sulfide-precipitated catalyst exhibits a curve which passes through the origin. From this, it appears that in conventionally prepared catalysts, some portion of the metal is not utilized, perhaps because of association with the support. In the precipitated catalyst, this effect is absent.

Conventional catalyst activity begins to deviate from linearity at between 2.0 and 2.5% w. Ni, while the sulfide-precipitated catalyst activity increases linearly with metal loading up to 3.5% w. Ni. Thus, with the sulfide precipitation method, more effective utilization of higher metal loadings is realized. The precipitation method of the invention also seems to reduce or eliminate losses in activity resulting from interaction of the metals with the support.

EXAMPLE IV

In this example, a catalyst comprising 2.3% Ni and 9.6% w. Mo on alumina, and containing 2.0% w. residual phosphorus from the phosphorous acid used to solubilize and stabilize the impregnating salt solution, was prepared by the method of the invention. After the sulfide precipitation and nitrogen drying, a portion of the catalyst was calcined in air. The air calcined catalyst was treated with a mixture of hydrogen and hydrogen sulfide at 1000 p.s.i.g. for 30 minutes at 400° F. and 30 minutes at 707° F. to reconvert the metal to the sulfide form. The catalyst that was nitrogen dried but not air calcined was subjected to an identical treatment merely for control purposes. Both catalysts were used to hydrogenate benzene at 662° F. as described in Example I. At the end of the five-hour test period, the benzene hydrogenation rate for each catalyst was as follows:

G. benzene/g. cat. hr.
Sulfide precipitated, nitrogen calcined _____ 1.42
Sulfide precipitated, nitrogen calcined air calcined __ 1.08

It is readily apparent that calcination in air is detrimental to hydrogenation activity of the catalyst.

The sulfide precipitated catalysts of the present invention are useful in many catalytic processes, including the removal of non-hydrocarbon impurities such as sulfur and nitrogen, etc., from a wide range of petroleum hydrocarbons. These catalysts have excellent hydrogenation and denitrification activity. Sulfide precipitated catalysts have been found to be particularly useful in improving the quality of jet fuel. This is demonstrated in Example V.

EXAMPLE V

A catalyst comprising 5.0% w. Ni, 20.5% w. Mo, and 2.0% P on alumina was prepared in accordance with the sulfide precipitation method of the present invention. This catalyst was employed to hydrogenate a 320–530° F. jet fuel fraction containing a cracked fraction. The aromatic, olefinic, sulfur and nitrogen content of the jet fuel fraction was significantly reduced. The reduction were as follows:

aromatics—about 98%
olefins—100%
sulfur—about 94%
nitrogen—about 99.9%

The catalysts prepared in accordance with the present invention are therefore highly active for hydrogenation, desulfurization and denitrification of hydrocarbons, whether as substantially pure hydrocarbons or as hydrocarbon fractions obtained, for example, from the refining of petroleum. In general, hydrotreatment is effected at about 100 to 3000 p.s.i.g., preferably 500 to 2000 p.s.i.g.; at about 0.1–20 LHSV, preferably about 0.5–10 LHSV; at 250–1000° F., preferably 500–800° F.; and at 0.5–20 $H_2$/oil mole ratio, and preferably at about 2–5 $H_2$/oil ratio.

EXAMPLE VI

This example illustrates the advantage of $H_3PO_3$ over $H_3PO_4$ as a solubilizing agent.

Two catalysts, according to the invention, identical with respect to final metal loadings, were prepared as in Example I. However, one used $H_3PO_3$ as the solubilizing agent (Catalyst "C") and the other used $H_3PO_4$ as the solubilizing agent (Catalyst "D"). Both were subjected to the post-impregnation treatment given Catalyst "B" in Example I.

Both catalysts "A" and "B" were then tested for benzene hydrogenation activity under identical conditions. The feed was a mixture of hydrogen and benzene (containing 0.5% w. S as dimethyl disulfide). The runs were made at 1000 p.s.i.g., 662° F. (350° C.), 11.0 $H_2$/oil, and 11.0 WHSV. The hydrogenation rate for Catalyst "D" ($H_3PO_4$) was 2.01, while it was 2.38 for Catalyst "C" ($H_3PO_3$). The tests results clearly show the advantage of using $H_3PO_3$ as the solubilizing agent.

To obtain full advantage of the invention, care should be exercised not to oxidize the catalysts, according to the invention, before or during use. Thus, when the catalyst is in use, the hydrogenation feed should contain sufficient sulfur to maintain the metals in sulfide form.

I claim as my invention:

1. A method of preparing a hydrogenation catalyst which comprises impregnating a porous solid catalyst support with an aqueous solution of a salt of a hydrogenation metal component selected from the group consisting of molybdenum, tungsten, iron group metals, and mixtures thereof, precipitating the hydrogenation metal component from solution as a sulfide compound, and drying the catalyst in an inert atmosphere.

2. The method of claim 1 wherein the support is a refractory metal oxide.

3. The method of claim 1 wherein the precipitation of the metal sulfide is effected by reaction with hydrogen sulfide.

4. The process of claim 3 wherein the precipitation of the metal sulfide is effected by reaction with hydrogen sulfide for a period of about 10 minutes to 100 hours.

5. The process of claim 4 wherein the catalyst is aged in the presence of hydrogen sulfide at a temperature of about 100° F. to 300° F.

6. The process of claim 4 wherein the refractory oxide is alumina.

7. The process of claim 1 wherein the metal is an iron group metal in combination with molybdenum or tungsten.

8. The process of claim 1 wherein the metal component is nickel in combination with bolybdenum and the refractory oxide is alumina.

9. The method of claim 1 wherein the aqueous solution is a phosphorous or phosphoric acid solution.

10. The method of claim 9 wherein the aqueous solution is a phosphorous acid solution.

11. The catalyst prepared according to claim 1.

References Cited

UNITED STATES PATENTS

| | | | |
|---|---|---|---|
| 3455,713 | 12/1948 | Voorhies | 252—439 |
| 3,058,896 | 10/1962 | Nahin | 252—439 X |
| 3,223,652 | 12/1965 | Erickson et al. | 252—439 |
| 3,516,926 | 6/1970 | Davis et al. | 252—439 |
| 3,528,910 | 9/1970 | Haney et al. | 252—439 X |
| 2,102,796 | 12/1937 | Happel et al. | 252—439 X |
| 2,224,071 | 12/1940 | Wassermann | 252—439 X |
| 1,948,408 | 2/1934 | Watts et al. | 252—439 |

FOREIGN PATENTS

| | | | |
|---|---|---|---|
| 1,123,136 | 8/1968 | Great Britain | 252—439 |

PATRICK P. GARVIN, Primary Examiner

U.S. Cl. X.R.

252—439; 208—216, 217, 254; 260—667